April 24, 1951     E. H. MUELLER     2,550,421
LOCK FOR VALVE CAPS OR THE LIKE
Filed Sept. 9, 1946
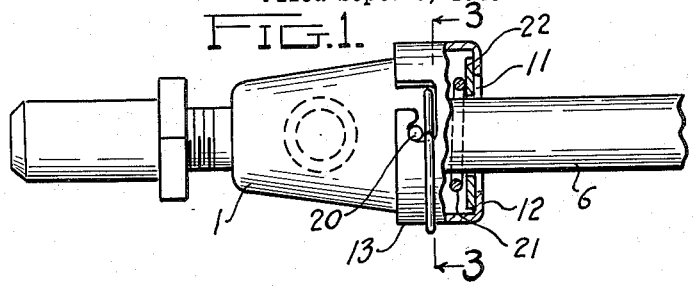
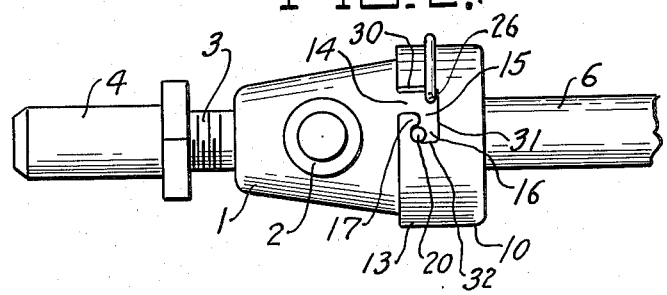
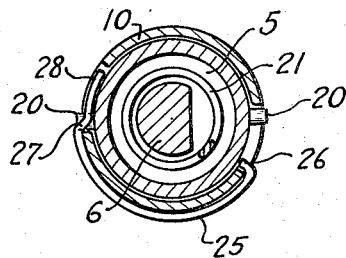
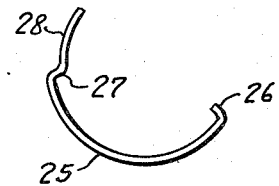
INVENTOR.
Ervin H. Mueller
BY
Barnes, Kisselle, Laughlin & Raisch
ATTORNEYS Patented Apr. 24, 1951

2,550,421

UNITED STATES PATENT OFFICE 2,550,421

LOCK FOR VALVE CAPS OR THE LIKE

Ervin H. Mueller, Grosse Pointe, Mich.

Application September 9, 1946, Serial No. 695,791

3 Claims. (Cl. 285—175)

This invention is directed particularly to a valve construction and especially a valve construction of the type which is used for controlling the flow of gas. Such valves are employed in various kinds of gas appliances, such as stoves, ranges and heaters, which burn gaseous fuel.

An object of the invention is to provide an improvement in a valve whereby elements thereof, which are united by means of a bayonet-type of joint, are positively locked against accidental disconnection. The valves in question usually include a chambered body with a tapered valve member rotatably positioned therein, the said valve member having an operating stem projecting therefrom. A cap is situated on the valve body through which the stem extends and this cap usually takes the reaction of a coil spring which holds the tapered valve member in its tapered seat in the valve body.

Heretofore, these caps have been secured to the valve body in various ways and one manner of attaching the cap to the body is through the means of what is commonly known as a bayonet-type of construction. One objection and difficulty with this type of mounting is that the cap may become accidentally released. If it does become released, as by means of being rotated or loosened by being wiped with a cloth or struck with an instrument, the valve member is no longer held on its seat and there may be a serious condition resulting from the escape of gas. On the other hand, the bayonet type of connection has its desirable features, in that the cap may be quickly and easily assembled and disassembled and the manufactured thereof is materially facilitated and cheapened.

The principal object of the present invention is to provide an improved locking arrangement in a bayonet connection as particularly applied to valves. In accordance with the invention the locking device is applicable to a standard type of valve construction in that no special provision in the valve construction is required to receive the locking device. The locking element or device is arranged to fit to the valve or its cap by its own yieldable action and yet there is a positive lock against the release of the cap from the body. With a construction following the invention, the valve bodies may be provided initially with or without the locking element as required by specifications of the purchaser or user, and valves once supplied without a locking element can be, at any time, equipped with the locking element. While it has been said herein that the invention is directed particulary to gas valves, the invention may be employed in any sort of construction having the form of bayonet type of connection disclosed, and in valves for any other purposes. A construction for carrying out the invention is disclosed in the accompanying drawings:

Fig. 1 is a view largely in side elevation and with some parts cut away and other in section showing a valve structure and a locking element applied thereto.

Fig. 2 is a side elevational view similar to Fig. 1 showing the valve turned through 180°.

Fig. 3 is a sectional view taken substantially line 3—3 of Fig. 1 showing the manner in which the locking element is applied to the cap.

Fig. 4 is a view illustrating the locking element.

For the purpose of disclosing the invention, a rather conventional type of valve is illustrated. The valve has a body 1 with an inlet extension 2 and a threaded outlet 3 designed to receive the usual outlet hood 4. The body is provided with a tapered chamber, which receives a tapered valve member 5 therein. This valve member is ported so that as it is rotatably adjusted, the connection between the inlet 2 and the outlet 3 is opened and closed to control the flow of gas. This structure is not shown as all in the art are familiar with valves of this type, and the particular construction may vary in many ways. Suffice it to say, that the valve member 5 has an operating stem 6 which projects therefrom, the stem being designed to receive a suitable handle.

The stem extends through a cap 10 which is attached to the valve body, the cap having an aperture 11 therein through which the stem passes. As shown herein, this cap is in the form of a cup like member having a bottom portion 12 in which the aperture 11 is located and a circular side wall 13. This side wall, on opposite sides thereof, is provided with bayonet-type slots as shown in Figs. 1 and 2. Each slot has an entrance way 14 and a passageway 15 which connects into a portion 16 of the slot. The passage 15 is relatively narrow as it is defined on one side by an abutment 17. The valve body is provided with lugs 20. The coil spring above mentioned is illustrated at 21 and a washer 22 may be employed between the spring and the bottom of the cap. This spring reacts against the cap and against the valve member 5 to thus hold the valve member on its seat. The application of the cap to the valve body is readily understood; the cap is pushed into position compressing the spring 21 with the lugs 20 passing through the entrance ways 14. Then the cap is turned so that the lugs move through the passages 15 and into the portion 16. The pressure on the cap is released and the lugs 20 engage behind the shoulders 17. It will be readily appreciated that while the cap is easily connected to and removed from the valve body that there is a danger of its becoming accidentally unconnected by being given a blow or accidentally or unintentionally turned by anyone who might be operating in or about the valve or, for example, wiping it clean with a cloth.

The locking element is shown in Fig. 4. This is in the form of a length of spring material, such as a metal spring wire having a body portion 25 of arcuate form designed to relatively snugly fit the wall 13 of the cap. One end of the body member is provided with an inturned portion or hook 26. The opposite end of the body portion is provided with an inturned portion or hook 27 and extending from the hook 27 is an element 28 which serves directly to lock the cap and the valve body against displacement.

The manner of application of this locking element is shown in Figs. 1, 2 and 3 and in considering its application, it may be pointed out that each bayonet slot has a wall portion 30 which defines one side of the entrance way 14, a back wall portion 31 and a wall 32 which defines the portion 16 and is disposed opposite the wall 30. After the cap has been applied to the valve, the locking element is then applied. As shown in Figs. 1, 2 and 3, the hook portion 26 is in engagement with the wall 30 of one bayonet slot; the body portion 25 extends around the flange 13 of the cap; the hook portion 27 is in engagement with the wall 32 of the bayonet slot on the opposite side of the cap. The locking or blocking element 28 lies within the bayonet slot as shown in Figs. 1 and 3 more or less parallel to the back wall 31. The locking element maintains itself in position by the inherent spring tendency of the material. Preferably, it holds itself in position sufficiently strong so that a sharp instrument is required to pry it out of position when it is desired to remove the cap.

Now, it will be observed, as shown in Fig. 1, that the portion 28 serves to restrict the width of the passage 15. Therefore, the lug 20 cannot be displaced through the passage 15. An operator may even push inwardly on the cap and try to turn the same but the cap cannot turn because the lug 20 will not pass through the passage 15 as it is restricted to provide insufficient space for the lug to pass therethrough. It is necessary only to lock one of the bayonet connections because if one of them is locked, the other cannot become loose.

The locking element is fool-proof in its use as it doesn't make any difference how it is applied. The hook portion 26 may be applied to the wall 32 of a beyonet slot. In this case, the hooked portion 27 engages the wall 30 of the opposite bayonet slot and the member 28 has sufficient length to lie along the wall 31 and restrict the passage 15. Likewise, the hook 26 may be applied to either wall 30 or 32 of the opposite bayonet slot. Accordingly, the locking member may be applied to the valve or cap in any one of four positions.

It will be observed that no strong forces are applied to the locking member itself. Therefore, the locking member or element is only required, by its elastic nature or spring nature, to hold itself in position gripping the walls 30 and 32 by its hook portions 26 and 27. If the cap should be pushed inwardly, the portion 28 merely takes compressive forces as it is engaged by the lug 20. If the cap be subjected to a turning motion the lug 20 again merely applies compressive forces on the element 28.

I claim:

1. In a coupling between a body member and a second member arranged to telescopingly fit the member, one of the members having oppositely disposed lugs, the other member having oppositely disposed bayonet-type slots for receiving the lugs, each bayonet-type slot having an abutment for the lug received thereby and a passage for movement of the lug into and out of a position of engagement with the abutment, and a locking element of spring wire-like material having a body portion, a hook formation at one end of the body formation for engaging in one bayonet slot, a second hook portion at the other end of the body member for engaging in the opposite bayonet type slot, and an extension on one hook member for lying in a bayonet type slot and serving to restrict said passage and thereby prevent the lug from moving out of locked engagement with the abutment.

2. In a valve construction having a body member and a cap member arranged to telescopingly fit the body member, said body member having oppositely disposed lugs, the cap member having oppositely disposed bayonet type slots with which the lugs engage for coupling the members together, each slot having an abutment for engagement with a lug and a passage for movement of the lug therethrough as the members are coupled and uncoupled, and a locking element of spring wire-like material having a body portion arranged to substantially fit around the cap, a hook portion on one end of the body portion for engaging with one bayonet type slot, a hook portion on the other end of the body portion for engaging in the opposite bayonet type slot, at least one of the hook portions having an extension for lying in a bayonet type slot and restricting the passage thereof to prevent movement of the lug out of locking engagement with the abutment.

3. A locking element comprising, a member of spring wire like material having a curved body portion, an inwardly extending hook portion at one end of the body portion, a second inwardly extending hook portion at the other end of the body portion and a projection extending from at least one of the hook portions substantially for the purposes described.

ERVIN H. MUELLER.

REFERENCES CITED

The following references are of record in the file of this patent:

UNITED STATES PATENTS

| Number | Name | Date |
| --- | --- | --- |
| 828,243 | Polmann | Aug. 7, 1906 |
| 981,866 | Lockhart | Jan. 17, 1911 |
| 995,966 | Hill | June 20, 1911 |
| 1,756,449 | Billerman | Apr. 29, 1930 |
| 2,008,156 | Rottum | July 16, 1935 |